United States Patent [19]

Heeg et al.

[11] 3,892,798

[45] July 1, 1975

[54] PROCESS FOR INTRODUCING TEREPHTHALIC ACID INTO A REACTION

[75] Inventors: Rudolf Heeg, Oberhochstadt; Alfred Striebich, Bad Vilbel, both of Germany

[73] Assignee: Davy-Ashmore Aktiengesellschaft, Frankfurt, Germany

[22] Filed: Sept. 11, 1972

[21] Appl. No.: 287,985

[30] Foreign Application Priority Data

Sept. 14, 1971 Germany............................ 2145761

[52] U.S. Cl............................. 260/475 P; 260/75 M
[51] Int. Cl.².......................................... C07C 69/82
[58] Field of Search................................ 260/475 P

[56] References Cited
UNITED STATES PATENTS

| | | |
|---|---|---|
| 3,431,243 | 3/1969 | Uno et al............................ 260/75 |
| 3,496,220 | 2/1970 | McCarty et al.................. 260/475 P |
| 3,497,473 | 2/1970 | Kemkes................................. 260/75 |
| 3,639,448 | 2/1972 | Matsuzawa et al.............. 260/475 P |
| 3,655,729 | 4/1972 | Rinehart........................... 260/475 P |
| 3,697,579 | 10/1972 | Balint et al....................... 260/475 P |

FOREIGN PATENTS OR APPLICATIONS 1,013,034   12/1965   United Kingdom

*Primary Examiner*—Lorraine A. Weinberger
*Assistant Examiner*—Michael Shippen
*Attorney, Agent, or Firm*—Molinare, Allegretti, Newitt & Witcoff

[57]        ABSTRACT

Terephthalic acid is introduced into a reaction zone maintained under a reaction pressure by compressing a powdered terephthalic acid, adding the compressed acid to a portion removed from the reaction in a ratio of about 1 to 33% by weight acid to removed portion, homogenizing the resultant mixture and returning it to the reaction zone.

9 Claims, 1 Drawing Figure

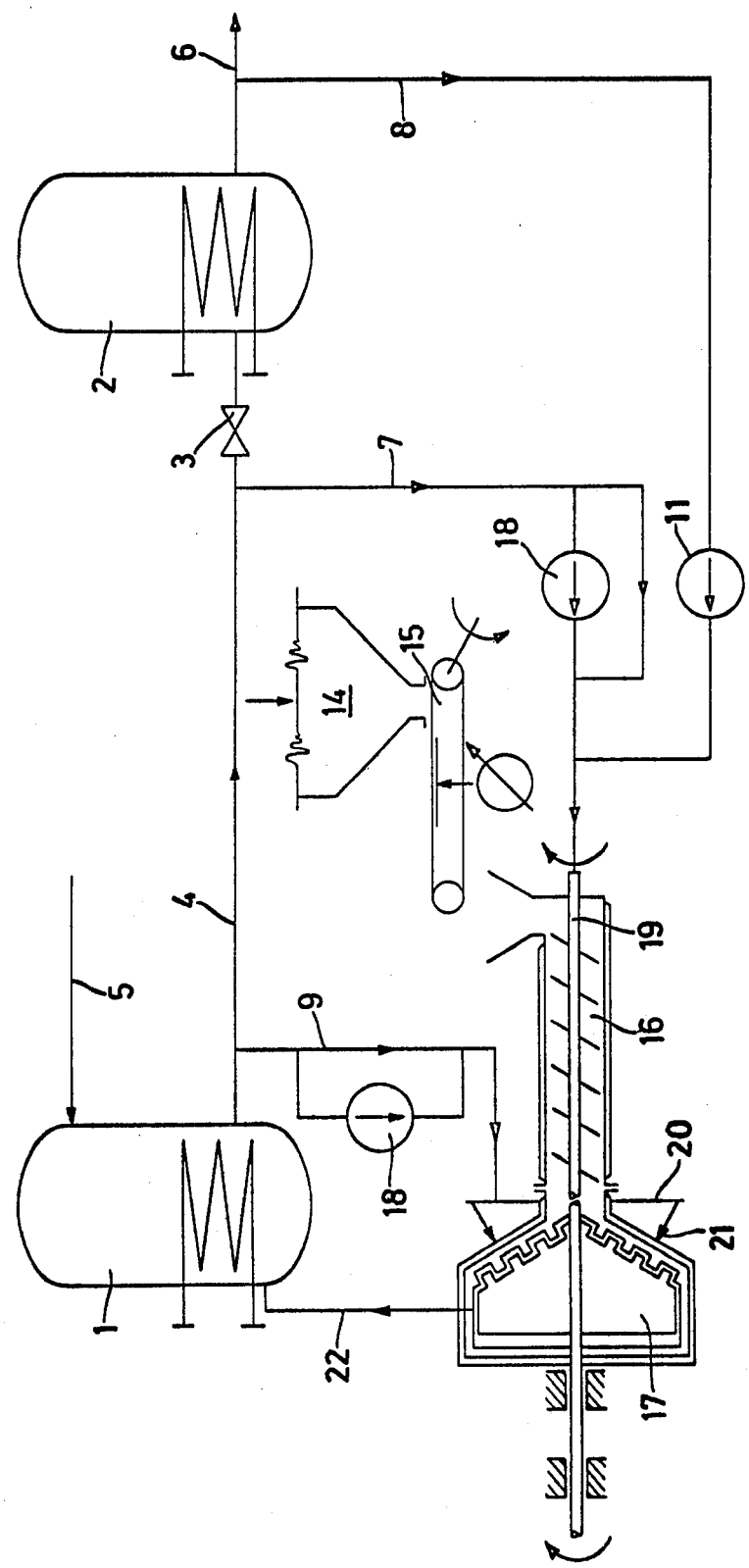

PROCESS FOR INTRODUCING TEREPHTHALIC ACID INTO A REACTION

BACKGROUND OF THE INVENTION

The invention relates to a process for the introduction of powdered terephthalic acid into a reaction mixture of terephthalic acid partially esterified with diols, preferably glycol. The terephthalic acid is added to the reaction mixture by drawing a portion of the reaction mixture, therefrom, adding the terephthalic acid to the portion withdrawn and returning the resulting product into the reaction mixture.

The addition of terephthalic acid into an esterification reaction mixture is difficult because the terephthalic acid cannot be melted and conveyed as a liquid by means of a pump into the reaction space. It is well known, to frequently utilize a paste of terephthalic acid and ethylene glycol to introduce the reactant into the reaction space. In the preparation of a conveyable paste, the grain distribution of the terephthalic acid, however, must lie within narrow limits. A paste or suspension with excessively fine granules of terephthalic acid exhibits thixotropic flow behavior. A paste with excessively coarse-grained terephthalic acid tends to separate out the coarse components by sedimentation. As a result, in both cases, pipe lines, pumps, etc. can be blocked, and interrupt production.

Further, the molar ratio of ethylene glycol to terephthalic acid cannot be arbitrarily low since for low ratios, the suspension is not pumpable. This is a significant disadvantage because a low molar ratio (for example 1:1.5–1.2) reduces glycol consumption and the formation of by-products, such as, for example, diethers.

Moreover, the preparation of the paste can cause difficulties when utilizing the commercially available fine granules of terephthalic acid. In introducing the paste into a reaction space maintained under esterification temperature, this paste must be heated in the feed line. During heating, the paste can pass through a temperature in the range of 150° to 180°C and a blocking of the line can occur through solidification of the paste.

The direct introduction of powdered terephthalic acid, separate from the glycol, into the reaction vessel raises problems in process technology. In the reaction vessel, the reaction water produced in the esterification and, corresponding to the particular operating conditions selected, the co-evaporating ethylene glycol, have to be removed overhead. When adding the powdered terephthalic acid through the vapor space of the reaction container, the glycol vapor can condense on the acid. As a consequence, addition rates and pressure fluctuations result at the point of addition.

In published German Application DAS 1,520,426, there is illustrated the withdrawal of part of a reaction mixture, cooling the withdrawn part, adding the terephthalic acid to the cooled mixture and reintroducing the resultant mixture into the hot reaction mixture. This procedure has a disadvantage, aside from the expensive intermediate cooling, in that a uniform distribution is not achieved of the terephthalic acid in the part removed from the reaction mixture and as a result of the cooling, certain constituents may precipitate a drop out. This makes it difficult to achieve a uniform mixture in the esterification stage.

SUMMARY OF THE INVENTION

It has been discovered that the disadvantages of the known processes can be avoided and a uniform introduction and dosing of powdered terephthalic acid into a reaction mixture can be achieved if, according to the present invention, the powdered terephthalic acid is compressed, apportioned in a quantitative ratio between about 1 and 33% by weight acid to the removed portion of the reaction mixture, and the resultant mixture obtained is homogenized before returning to the reaction. Since the initial portion of the esterification reaction frequently takes place under excess pressure and the portion of the reaction mixture removed for the purpose of treatment with terephthalic acid is to be maintained under the reaction pressure, it is necessary to compress the powdered terephthalic acid before adding it substantially at the reaction pressure. This excess reaction pressure can be up to 12 atmospheres and in special cases, can be higher. Preferably, the compression pressure lies in the range between 1 and 10 atmospheres excess pressure. If the terephthalic acid is introduced in a quantitative ratio so that the portion of the reaction mixture, to which the terephthalic acid is added, contains between about 1 and 33% by weight of terephthalic acid, it is possible to produce a homogenized mixture before returning it to the reaction. No additional equipment is required since the entire terephthalic acid dossage can be dissolved in the withdrawn portion of the reaction mixture. In any event, the homogenized mixture, if the entire terephthalic acid dosage is not dissolved, has a mechanical, uniform, fine distribution of the solid terephthalic acid in the mixture.

The compression (Verdichtung) of the powdered terephthalic acid to the pressure of the reaction mixture is accomplished by a conveyor worm. The part of the esterification mixture to be treated with terephthalic acid is supplied through a hollow shaft in the conveyor worm and/or directly to the homogenizer. Several connecting pieces connected in an annular line expediently serve to supply the homogenizer. The quantitative dosing and addition of the terephthalic acid can take place, for example, with a conveyor-type weigher or a dosing worm. The homogenization should be carried out in an apparatus for submixing, distributing and grinding, for example a high-speed colloid mill, or a worm mixer with special mixing elements.

According to the preferred method for executing the process of the present invention, in a multistage esterification reaction, a partial stream of the esterification mixture is removed after the first esterification stage and, after the addition of the terephthalic acid and homogenization, returned into this same stage. The partial stream drawn off for treatment with terephthalic acid preferably amounts to a multiple of the quantitative stream passed to the second esterification stage. This achieves a uniform distribution of the terephthalic acid in the first esterification stage.

Further, there is provided in a multistage esterification wherein after the second and, possible, further esterification stages, partial streams are removed, combined with the partial stream from the first esterification stage, and the resultant mixture is returned to the first stage. In this system, the partial stream from the first stage amounts to at least 50% of the sum of the partial streams from all the stages. Further, the size of the partial streams from the subsequent stages is reduced as the number of stages increases. Through the decreased removal in streams from the second and possible subsequent esterification stages and combination with the partial stream from the first stage, there results a total stream in which the solubility of the terephthalic acid, because of the higher degree of esterification, is greater than in the partial stream removed from the first stage. The mixture is to be homogenized before it is returned to the first stage.

Preferably, in the removal of partial streams from the first and second esterification stages, the quantitative ratio of the two partial streams is about 1:1–9:1 i.e., 50 to 90% of the total stream to be treated with terephthalic acid is taken from the reaction mixture from the first esterification stage.

In a multistage continuous esterification process there is frequently used an excess pressure which decreases from stage to stage; for example, in the first esterification stage 5 atmospheres excess pressure is used and in the second esterification state 2 atmospheres excess pressure is used. In this case, it is required that the partial streams from the stages subsequent to the first esterification stage be brought to the pressure of the partial stream from the first esterification stage. In the specific example mentioned, this means that the pressure of the product removed from the second esterification stage is increased from 2 to 5 atmospheres excess pressure. This increase in the pressure of the partial streams, necessary for returning the mixture to the first esterification stage is accomplished by pumps arranged in the partial stream lines.

Further, it is provided, that the pressure of the homogenized mixture returned to the reaction is increased at least to the pressure of the reaction mixture at the place of return. In this case, the homogenizer generates a certain pumping action which suffices to maintain in circulation the partial stream removed from the first esterification stage.

Heat is preferably supplied to the mixture during the homogenization. In the homogenization, the terephthalic acid can undergo an esterification reaction, in which process heat is consumed. This heat is then supplied to the homogenizer through a heating jacket. Also, the frictional heat arising in the homogenizer supplies a portion of the heat requirement in the initial stages of esterification.

Preferably, less than 85% of the powdered terephthalic acid has a granule size less than 40 $\mu$, with the remaining granule having a size between 40 and 800 $\mu$. By maintaining these granule sizes, a homogeneous distribution of the terephthalic acid is possible with the usual, above-mentioned homogenizing apparatuses. Preferably, the amount of terephthalic acid added to the esterification mixture drawn from the esterification is such that the final mixture contains 1.6 to 25% by weight of terephthalic acid. The terephthalic acid-containing mixture is easily homogenized with the use of shearing velocities of $2.5 \times 10^3$ to $1.25 \times 10^5$ sec$^{-1}$. The residence time of the mixture in the homogenizer preferably does not exceed the time of 2 minutes, since with longer homogenization time there are no further improvements in the degree of distribution.

DESCRIPTION OF THE DRAWINGS

The invention is described in more detail be referring to the attached drawing, which schematically represents an installation for the two-stage esterification of terephthalic acid with ethylene glycol with introduction of the terephthalic acid according to the present invention.

Referring to the drawing, the installation consists of a first esterification reactor 1 and a second esterification reactor 2, connected by process line 4 containing a pressure control valve 3. Ethylene glycol is supplied to the reactor 1 by line 5. The esterification mixture leaves the reactor 2 through line 6. Reactor 1 operates under a pressure of 5 atmospheres excess pressure and reactor 2 under a pressure of 2 atmospheres excess pressure.

The terephthalic acid passes from a feed silo 14 over a conveyor-type weigher 15 into the inlet hopper of a concentrating worm 16. In worm 16, the terephthalic acid is compressed to the reaction pressure of the first esterification stage. Following compression worm 16 is a heatable homogenizer 17.

The partially esterified and partially condensed mixture from the second esterification stage passes through line 8 to the pump 11, and is compressed to the 5 atmospheres excess pressure of the first esterification stage. The compressed mixture is combined with the esterification mixture from stage 1 removed by line 7. Line 7 is provided with a bypass line in which there is positioned a circulation pump 18. The combined partial streams from the lines 7 and 8 are passed through the hollow shaft 19 of the compressing worm 16 and the homogenizer 17. Simultaneously, an additional partial stream is removed by line 9 from line 4 and fed through a ring line 20 and connecting pieces 21, and then to the homogenizer. In the homogenizer 17, the terephthalic acid fed through compression worm 16 is intimately mixed with the esterification streams fed in through partial stream lines 7, 8 and 9. In this process, the terephthalic acid goes partially into solution. The homogeneous mixture, laden with terephthalic acid, then passes through line 22 back into the esterification reactor 1.

EXAMPLES

The present invention is further illustrated by the following specific examples:

Example 1

From an esterification stage, of a multistage continuous installation, under a pressure of 10 atmospheres excess pressure equipped with an inlet heat exchanger, there is continuously removed an esterified product and fed through a dosing circulation pump. This pump maintains a constant circulation through the hollow shaft of a powder conveying worm into a homogenizer. The esterification product (polycondensation degree = 0.47, esterification degree = 0.75) has a temperature of 270°C and a dynamic viscosity of 0.5 poise. Powdered terephthalic acid (TPA) is continuously dosed by a dosing conveyor type weight from a supply silo into the hopper of the conveyor worm. The TPA-powder has a granulation distribution according to classification I as defined in Table 1.

The hourly circulation rate of the 75% esterified product in a pilot plant for the generation of 850 kg/day of polyethylene terephthalate with a 6-fold product circulation amounts of 145 kg/hr. The addition of TPA-powder amounts to 26.2 kg/hr.

The pressure loss resulting from flow through the regulating valve and the pipe lines in the circulation system is 0.2 atmospheres. This loss is balanced by the force-conveyance dosing pump.

The terephthalic acid is finely distributed in the esterification product by the homogenizer and, up to entry into the first esterification stage is completely dissolved. The total residence time of the mixture in the pipe line system and in the inlet heat exchanger is 6 minutes. The TPA is partially esterified with the free and bond glycol in circulation at a mean temperature of 260°C. A theoretical mixing temperature of 240°C is increased by the friction in the homogenizer to 260°C. The power absorption of the homogenizer amounts to 3 Kw. The amount of glycol (EG) fed to the first esterification stage amounts to 18.6 kg/hr and corresponds to a molar ratio of TPA/EG = 1:1.6.

Example 2

In a pilot installation with a daily production of 1300 kg of polyethylene terephthalate, 1200 kg/hr of an 85% esterified product with a polycondensation degree of 0.50 is put into the circulation from the first reaction stage with a rotary pump. The first stage is under a pressure of 5 atmospheres excess pressure at a temperature of 260°C.

The first stage is connected with a separate column which distills the vapors consisting of a mixture of water and glycol, evaporating from the esterification stage. The sump product glycol is fed to the first esterification stage. The amount of fresh glycol added is 24 kg/hr, and corresponds to a molar ratio of TPA:glycol = 1:1.35. The amount of glycol flowing back from the column amounts to 5.35 kg/hr and corresponds to 0.3 moles of glycol.

The circulation product is fed through the hollow shaft of a compression worm and over several places of a distributor ring into a heated homogenizer. The terephthalic acid (classification I) is brought over a compression worm to the system pressure of 5 atmospheres excess pressure and is conveyed in an amount of 47 kg/hr into the homogenizer. By reason of the intensive mixing action of the homogenizer, the terephthalic acid is so finely distributed in the esterification product that, because of the existing concentration difference, it immediately goes into solution. Parallel to this, the esterification reaction sets in. The product temperature at the outlet of the homogenizer is maintained under the 260°C condition, which corresponds to the temperature in the first reaction stage.

Example 3

The pilot plant described in Example 2 is operated at 265°C under a pressure of 10 atmospheres excess pressure. The esterification degree of the product is to 0.70 and the polycondensation degree is 0.52. Circulation amount, amount of TPA added (classification II) and the operation of the equipment correspond to that in Example 2. The column, however, is not used. Rather, the vapors are fed through a pressure-release valve to a condenser. The amount of TPA to be introduced is mixed with the esterification product in the homogenizer to form a flowable suspension, in which the coarse TPA particles are mechanically comminuted. Thereafter, the suspension is supplied to the first esterification stage. By reason of the low reaction, the esterification product is present as a saturated solution. As a result, the TPA goes into solution and esterifies only in the reaction container. The amount of glycol passed into the esterification stage amounts to 29.4 kg/hr and corresponds to a molecular ratio of TPA : glycol = 1 : 1.65.

Example 4

The pilot plant described in Example 2 is operated under normal pressure and a temperature of 245°C. The esterification degree of the product is 0.60. The hourly circulation amount is 3,000 kg/hr and is conveyed by a rotary pump to a homogenizer standing under normal pressure.

The powdered terephthalic acid (classification III) is added to the homogenizer by a simple dosing worm over a fall tube veiled with nitrogen. The TPA is then mechanically ground and mixed with the esterified circulation product and fed into the first esterification stage. The TPA is not dissolved during the mixing operation since the esterification product itself still contains 10% of undissolved terephthalic acid.

The fresh glycol is fed into the first esterification stage in an amount of 32 kg/hr and corresponds to a molar ratio of 1:1.8.

Example 5

In the pilot plant according to Example 2, in addition to the circulation amount taken from the first reaction stage, there is also withdrawn a further partial stream from the second esterification stage. The second stage is under a pressure of 2 atmospheres excess pressure and the stream is withdrawn by a pump which brings the system to a pressure of 5 atmospheres excess pressure. The resultant compressed mixture is fed through the hollow shafts of a powder double worm into a heated homogenizer. The first partial stream amounts ot 1200 kg/hr. It has an esterification degree of 0.85 and a polycondensation degree of 0.50. The amount removed from the second stage amounts to 600 kg/hr. The second product has an esterification degree of 0.92 and a polycondensation degree of 0.67. Both partial streams have a temperature of 260°C. Glycol in an amount of 21.3 kg/hr, corresponding to a molar ratio of 1:1.2 is added. By utilizing an additional withdrawn partial stream there are saved 0.15 moles of glycol as compared to the process illustrated in Example 2.

Example 6

In a discontinuous installation for the generation of 1.67 tons of polyethylene terephthalate per charge, there is installed a set of esterification equipment, described as follows.

In a pressure container, designed and constructed to operate as a pure flash stage, there is installed a product circulation system consisting of a rotary pump, a homogenizer with a pre-engaged powder conveyor worm and a heat exchanger centrally arranged under the esterification stage. A product removal connecting piece is positioned laterally beneath the liquid level.

The entry connecting piece is positioned on the lower part of the heat exchanger. The esterification of TPA and glycol is carried out as follows:

Initially, 1115 kg of ethylene glycol (2.0 moles) are introduced into the system and heated to 170°C. The glycol is maintained in circulation through the rotary pump to the bypass to the homogenizer with powder conveyor worm, and through the heat exchanger. Toward the end of a heating operation of 5 minutes, TPA powder is brought through a dosing device into the entry portion of the powder conveyor worm, compressed and fed to the homogenizer. Simultaneously, the quantitative flow of glycol in the bypass is lessened stepwise. The glycol is fed by means of a ring line into the homogenizer and from there, mixed with TPA. The mixture is passed through the heat exchanger and into the flash stage.

The system pressure is then raised to 5 atmospheres excess pressure and the product is continuously heated to 250°C. In 1/2 hour, 1435 kg of terephthalic acid (classification IV) is added in a linear fashion. As the reaction sets in, the circulation is steadily enriched with esterified product. After completion of the TPA addition, the conversion (Umsatz) amounts to 65%. The circulation is again shifted over to the bypass mentioned above.

In the following period of 60 minutes, the pressure is brought down to 0 atmospheres excess pressure and the temperature is raised to 270°C. Thereafter, the conversion amounts to 95%.

Example 7

Analogous to Example 6, there are retained in a discontinuous installation 350 kg of precondensate from the preceding charge which is circulated in a circulation system as described in Example 6, which, however, has no bypass to the homogenizer with the powder conveyor worm. The precondensate is fed over a ring line directly into the heated homogenizer. Between the homogenizer and the self-cleaning powder conveyor worm, there is a blocking member. The process procedure corresponds to that described in Example 6. For the addition of TPA (classification I), the powder worm, still filled with TPA from the preceding charge, is placed in operation and the blocking member simultaneously opened. During the half-hour filling process, the system pressure is built up by the vapors liberated in the reaction. Simultaneous with the addition of TPA powder, 835 kg of glycol is dosed in a constant molar ratio of 1:1.5, directly into the liquid space of the esterification stage by a pump against the system pressure. The system pressure is selected by a pressure-release valve.

A penetration of the precondensate into the two-shaft conveyor worm is prevented by the chosen self-cleaning worm geometry. After termination of the TPA addition, the valve is again closed. The circulation of the precondensate is maintained during the following one-hour esterification reaction.

We claim:

1. In a process for introducing powdered terephthalic acid into a reaction mixture of terephthalic acid, partially esterified with ethylene glycol in a pressurized reaction vessel in an esterification reaction zone maintained at superatmospheric pressure wherein the ethylene glycol is introduced only directly into the reaction vessel, the improved process for adding the terephthalic acid to the reaction mixture which comprises removing a portion of the reaction mixture from the reaction zone, raising the pressure of the powdered terephthalic acid to substantially the pressure of the reaction zone; adding the pressurized powdered acid to the removed portion of the reaction mixture, without intermediate cooling of said removed portion of the reaction mixture or ethylene glycol addition thereto in a quantitative ratio of powdered acid to removed portion of the reaction mixture of about 1 to 33% by weight; homogenizing the resultant mixture in a homogenizer and returning the resultant homogenized mixture to the reaction mixture.

2. A process according to claim 1 wherein the reaction zone comprises multiple reaction stages, each stage comprising a separate vessel for the esterification of terephthalic acid, and having a first and subsequent reaction stages and a partial stream is removed after the first esterification stage and, after addition of terephthalic acid and homogenization thereto is returned to this first stage.

3. A process according to claim 2 wherein after a stage subsequent to the first stage, a partial stream is removed, combined with the partial stream removed from the first esterification stage and the resultant mixture returned to the first stage, said process further characterized in that the partial stream from the first stage amounts to at least 50% of the sum of any partial streams from all the subsequent stages and the partial streams from the further stages are progressively smaller as the number of stages increases.

4. A process according to claim 3, wherein the partial streams from the subsequent esterification stages are pressurized to the pressure of the partial stream from the first esterification stage.

5. A process according to claim 1 wherein the pressure of the return mixture is increased during the homogenization to at least the pressure of the reaction mixture.

6. A process according to claim 1 wherein heat is supplied to the mixture during the homogenization.

7. A process according to claim 1 wherein less than 85% of the powdered terephthalic acid has a finest granule size less than 40 $\mu$ and the balance has a granule size between 40 and 800 $\mu$.

8. A process according to claim 1 wherein the terephthalic acid is added so that the final mixture has a ratio of acid between 1.6 and 25% by weight.

9. A process according to claim 1 wherein the terephthalic acid-containing mixture is homogenized through the use of rates of shear of $2.5 \times 10^3$ to $1.25 \times 10^5$ sec$^{-1}$.

TABLE I

POWDERED TEREPHTHALIC ACID POWDER CLASSIFICATION

| Mesh width | 40 $\mu$ | 63 $\mu$ | 90 $\mu$ | 125 $\mu$ | Sieve residue (%) 160 $\mu$ | 250 $\mu$ | 315 $\mu$ | 500 $\mu$ | 630 $\mu$ | 800 $\mu$ |
|---|---|---|---|---|---|---|---|---|---|---|
| I | 26 | 22.4 | 19.6 | — | 13.2 | 5.2 | 3.2 | — | — | — |
| II | 98 | 98 | 97.6 | — | 95.6 | — | 79 | 20.4 | 2.5 | Traces |
| III | 76.6 | 56.9 | 40.4 | 25.9 | — | 2.0 | — | — | — | — |
| IV | (32$\mu$) 20 | 12 | 5 | 1.4 | — | — | — | — | — | — |

* * * * *